(12) United States Patent
Rah

(10) Patent No.: US 12,507,942 B2
(45) Date of Patent: Dec. 30, 2025

(54) DEVICE FOR TESTING EARTH GRAVITY SENSING FUNCTION ON BASIS OF VIRTUAL/AUGMENTED REALITY INTERFACE AND BIOSIGNAL MEASUREMENT DEVICE

(71) Applicant: KOREA UNIVERSITY RESEARCH AND BUSINESS FOUNDATION, Seoul (KR)

(72) Inventor: Yoon Chan Rah, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 452 days.

(21) Appl. No.: 18/012,664

(22) PCT Filed: Jun. 18, 2021

(86) PCT No.: PCT/KR2021/007667
§ 371 (c)(1),
(2) Date: Dec. 23, 2022

(87) PCT Pub. No.: WO2021/261845
PCT Pub. Date: Dec. 30, 2021

(65) Prior Publication Data
US 2023/0255539 A1    Aug. 17, 2023

(30) Foreign Application Priority Data

Jun. 23, 2020 (KR) .................. 10-2020-0076122
Jun. 8, 2021 (KR) .................. 10-2021-0074106

(51) Int. Cl.
*A63B 6/00* (2006.01)
*A61B 5/00* (2006.01)
(Continued)

(52) U.S. Cl.
CPC .......... *A61B 5/4023* (2013.01); *A61B 5/1116* (2013.01); *A61B 5/163* (2017.08);
(Continued)

(58) Field of Classification Search
CPC ....... A61B 5/4023; A61B 5/163; A61B 5/378; A61B 5/1116; A61B 5/6803; A61B 5/7445; A61B 2562/0219
See application file for complete search history.

(56) References Cited

U.S. PATENT DOCUMENTS 4,848,358 A * 7/1989 Nitzan .................. A61B 5/377
5/636
6,052,609 A * 4/2000 Ripoche ................ A61B 5/291
600/509
(Continued)

FOREIGN PATENT DOCUMENTS

KR 10-2016-0005519 A 1/2016
KR 10-2018-0009472 A 1/2018
(Continued)

OTHER PUBLICATIONS

International Search Report for PCT/KR2021/007667 mailed Oct. 15, 2021 from Korean Intellectual Property Office.

*Primary Examiner* — Cheng Yuan Tseng
(74) *Attorney, Agent, or Firm* — Revolution IP, PLLC

(57) ABSTRACT

A gravity perception function inspection apparatus based on virtual/augmented reality and multiple bio-signal sensors, includes a head-wearable display device worn on an examinee's head and reproducing an inspection screen in which a target object is displayed in a center of the inspection screen, the bio-signal measuring device including an eye tracker that detects a pupil size of an examinee and a posture measuring device that infers a posture value of the examinee by using a plurality of inertial measurement sensors dispersedly arranged on a body of the examinee and obtains and (Continued)

outputs a position control value corresponding to the posture value of the examinee, a human interface device that obtains and outputs a position control value manually input by the examinee, and a control device that generates and provides the inspection screen.

10 Claims, 7 Drawing Sheets

(51) Int. Cl.
*A61B 5/11* (2006.01)
*A61B 5/16* (2006.01)
*A61B 5/378* (2021.01)

(52) U.S. Cl.
CPC ............ *A61B 5/378* (2021.01); *A61B 5/6803* (2013.01); *A61B 5/7445* (2013.01); *A61B 2562/0219* (2013.01)

(56) References Cited

U.S. PATENT DOCUMENTS

| | | | |
|---|---|---|---|
| 6,613,003 B1* | 9/2003 | Bles | A61B 5/1036 600/595 |
| 8,783,872 B2* | 7/2014 | Giraudet | G02C 7/061 351/204 |
| 9,572,488 B2* | 2/2017 | MacDougall | A61B 3/145 |
| 9,870,726 B2* | 1/2018 | Yajima | H02N 2/18 |
| 9,952,679 B2* | 4/2018 | Kondo | G06F 3/013 |
| 10,136,810 B2* | 11/2018 | Migliaccio | A61B 3/113 |
| 10,571,689 B2* | 2/2020 | Shimura | G02B 27/017 |
| 10,736,545 B1* | 8/2020 | Berme | A61B 3/028 |
| 10,773,122 B2* | 9/2020 | Orr | G02B 27/0176 |
| 10,832,483 B2* | 11/2020 | Oh | G06F 3/015 |
| 10,860,117 B2* | 12/2020 | Cho | G06F 3/0383 |
| 10,981,004 B2* | 4/2021 | Bloch | A61N 1/36062 |
| 11,308,694 B2* | 4/2022 | Nakata | G06F 3/013 |
| 11,334,155 B2* | 5/2022 | Qin | G02C 11/10 |
| 11,368,664 B2* | 6/2022 | Miki | G06F 3/012 |
| 11,380,021 B2* | 7/2022 | Nakata | A63F 13/211 |
| 11,468,977 B2* | 10/2022 | Roy | A61B 5/1114 |
| 11,523,963 B2* | 12/2022 | Geisinger | G02B 27/0176 |
| 11,580,701 B2* | 2/2023 | Chaurasia | G06F 3/013 |
| 2005/0168692 A1* | 8/2005 | Harbin | A61B 5/4023 351/202 |
| 2007/0132841 A1* | 6/2007 | MacDougall | A61B 3/113 348/78 |
| 2012/0038630 A1* | 2/2012 | Amorim | G01S 5/163 345/419 |
| 2018/0206773 A1* | 7/2018 | Yu | A61B 5/0024 |
| 2018/0239430 A1* | 8/2018 | Tadi | G06F 3/013 |
| 2019/0246890 A1* | 8/2019 | Kerasidis | A61B 3/0008 |
| 2020/0060573 A1* | 2/2020 | Cohen | A61B 5/6803 |
| 2022/0108561 A1* | 4/2022 | Groß | G06V 40/25 |

FOREIGN PATENT DOCUMENTS

| | | | |
|---|---|---|---|
| KR | 10-2019-0004088 A | 1/2019 | |
| KR | 10-1919497 B1 | 2/2019 | |
| KR | 10-2020598 B1 | 9/2019 | |
| KR | 10-2019-0136313 A | 12/2019 | |
| WO | WO-2005077259 A1* | 8/2005 | ............ A61B 3/113 |
| WO | WO-2018047102 A1* | 3/2018 | ............ A61H 1/0229 |
| WO | WO-2020262973 A2* | 12/2020 | ............ A61B 3/0091 |

* cited by examiner

- Prior Art –

INCREASE OF PERCEPTION
REQUIREMENTS AND
PUPIL EXPANSION

DECREASE OF PERCEPTION
REQUIREMENTS AND
PUPIL CONSTRICTION

FIG. 5

1) VESTIBULAR FUNCTION (OTOLITH ORGAN FUNCTION) INSPECTION
(1) DARK FIELD (BLACK) WITHOUT VISUAL STIMULUS OR ADDITIONAL OBJECT BACKGROUND SCREEN WITH COUNTLESS SMALL DOTS
(2) ACCURACY MEASUREMENT OF GRAVITY PERCEPTION THROUGH VISUAL BAR FOR INSPECTION OR VERTICAL ADJUSTMENT OF HUMAN BODY POSTURE
(3) PERCEPTION LOAD MEASUREMENT BASED ON PUPIL SIZE

2) VISUAL-VESTIBULAR INTERACTION INSPECTION
(1) BACKGROUND SCREEN WITH STRUCTURED VISUAL FLOW
- STRAIGHT-LINE VISUAL FLOW IN VERTICAL DIRECTION, HORIZONTAL DIRECTION, AND OBLIQUE DIRECTION OF SPECIFIC ANGLE
- CLOCKWISE/COUNTERCLOCKWISE ROTATION VISUAL FLOW
- VISUAL FLOW IN FORM OF RADIALLY SPREADING FROM CENTER OR CONVERGING TO CENTER, ADJUSTMENT OF DIFFUSION RATE FOR EACH PART
- FLOW RATE AND DIRECTION ARE PROVIDED IN COMBINATION IN VARIOUS TAGES
(2) BACKGROUND SCREEN WITH STOP VISUAL INFORMATION
- STRAIGHT LINE STOP VISUAL INFORMATION IN VERTICAL DIRECTION, HORIZONTAL DIRECTION, AND OBLIQUE DIRECTION OF SPECIFIC ANGLE
- RADIAL OR CIRCULAR AND IRREGULARLY CURVED STOP VISUAL INFORMATION OF ROLL PLANE WITH RESPECT TO CENTER
(3) ACCURACY MEASUREMENT OF GRAVITY PERCEPTION THROUGH VERTICAL ADJUSTMENT OF VISUAL BAR FOR EXAMINATION OR HUMAN BODY POSTURE
(4) PERCEPTION LOAD MEASUREMENT BASED ON PUPIL SIZE

DEVICE FOR TESTING EARTH GRAVITY SENSING FUNCTION ON BASIS OF VIRTUAL/AUGMENTED REALITY INTERFACE AND BIOSIGNAL MEASUREMENT DEVICE

TECHNICAL FIELD

The present invention relates to a gravity perception function inspection apparatus that is capable of miniaturization and movement inspection of an apparatus by using an electroencephalogram measuring device including a virtual/augmented reality interface, a pupil response measurement, and a bio-signal measuring device and is based on the virtual/augmented reality interface and the bio-signal measuring device for evaluating perception requirements and perception function such as dementia.

BACKGROUND ART

Otolith organs located in the inner ears on both ears perceive the gravity among the vestibular organs and maintains a posture to be perpendicular to the gravity.

A known inspection for evaluating otolith organ function includes a subjective visual vertical (SVV) inspection, which measures a degree of accuracy of individual gravity perception by measuring an error angle between the vertical direction due to the actual gravity and a direction of a rod finally matched by an examinee after a given long bar is vertically aligned at a certain angle that does not coincide with the vertical direction.

When functions of otolith organs are abnormal due to a vestibular disease, the error angle increases to a certain level or more (usually 2-3 degrees or more).

However, as illustrated in FIG. 1, the inspection has to be performed in a dark field with a rod of a fairly long length installed therein and lighting of a laboratory turned off at a distance of 1 m, and thus, the inspection has a disadvantage in that an inspection space is very low in efficiency of use.

SUMMARY OF INVENTION

Technical Problem

In order to solve the above problems, the present invention provides a gravity perception function inspection apparatus which is based on a virtual/augmented reality interface and a bio-signal measuring device and enables miniaturization of an apparatus and minimization of inspection space constraints by using the virtual/augmented reality interface and the bio-signal measuring device.

In addition, the human body uses not only the otolith organs but also the visual information with a high weight to maintain the vertical posture, but the known apparatus does not have a function to evaluate this, and thus, the present invention provides an inspection apparatus for evaluating a degree of accuracy of gravity perception.

In addition, the present invention provides an inspection apparatus that requires the human body to be in a vertical posture in a daily life beyond an indirect method of visually aligning the vertical rod placed outside the human body and evaluates the degree of accuracy of gravity perception in a more physiological way through a method of calculating an error in an actual vertical direction by using an inertial measurement sensor.

In addition, the present invention provides a gravity perception function inspection apparatus based on a virtual reality interface and a bio-signal measuring device which evaluates an examinee's gravity perception function from more diverse viewpoints.

In addition, the present invention provides a gravity perception function inspection apparatus based on a virtual reality interface and a bio-signal measuring device which may check and notify perception requirements for each inspection item based on a pupil response by considering that a gravitation perception process requires high perception by integrating visual information and somatosensory information as well as vestibular sensory information obtained from the otolith organs.

In addition, the present invention may be used as a bio-signal marker for a screening inspection for evaluating perception requirements and perception ability such as dementia for understanding and solving the current situation by measuring response of a brain nervous system of an examinee by using an electroencephalogram measuring device.

Objects of the present invention are not limited to the objects described above, and other objects not described will be clearly understood by those skilled in the art from the following description.

Solution to Problem

According to an embodiment of the present invention, a gravity perception function inspection apparatus based on virtual/augmented reality interface and bio-signal measuring device, includes a head-wearable display device worn on an examinee's head and reproducing an inspection screen in which a target object is displayed in a center of the inspection screen, the bio-signal measuring device including an eye tracker that detects a pupil size of an examinee, and a posture measuring device that infers a posture value of the examinee by using a plurality of inertial measurement sensors dispersedly arranged on a body of the examinee and obtains and outputs a position control value corresponding to the posture value of the examinee, a human interface device that obtains and outputs a position control value manually input by the examinee, and a control device that generates and provides the inspection screen, compares the position control value obtained by any one of the posture measuring device and the human interface device with a preset target position value to obtain and provide a gravity perception error value, and additionally obtains and provides perception requirements based on the pupil size of the examinee, wherein the bio-signal measuring device further includes an electroencephalogram measuring device that measures response of a brain nervous system of the examinee and additionally calculates individual perception requirements and a change in the brain nervous system according to an inspection mode.

The control device may perform at least one of a vestibular function inspection and a visual-vestibular interaction inspection and configures and provides an inspection screen differently depending on inspection items.

The control device may collect the gravity perception error value and the perception requirements for each inspection item and generate and provide a result report.

The control device may perform the vestibular function inspection based on a basic inspection screen in which the target object is centrally displayed on a black background.

The control device may perform the vestibular function inspection based on the inspection screen in which the target object is centrally displayed on a black background and a plurality of small additional objects are additionally displayed.

The control device may perform the visual-vestibular interaction inspection based on the inspection screen in which the target object is centrally displayed on a black background and that additionally provides a structured visual flow in which positions of a plurality of additional objects are moved according to a preset pattern.

The control device may perform a structured visual flow through at least one of a visual flow in which a plurality of additional objects move in a horizontal direction, a visual flow in which the plurality of additional objects move in a vertical direction, a visual flow in which the plurality of additional objects move in an oblique direction, a visual flow in which the plurality of additional objects rotate in a clockwise direction, a visual flow in which the plurality of additional objects rotate in a counterclockwise direction, and a visual flow in which the plurality of additional objects radiate or converge from a center of the inspection screen to a periphery thereof.

The control device may perform the visual-vestibular interaction inspection based on the inspection screen in which the target object is centrally displayed on the black background and an additional object for inducing visual distortion is additionally displayed.

The control device may implement at least one of an additional object that halves the black background in the horizontal direction for the additional object for inducing visual distortion, an additional object that halves the black background in an oblique direction, an additional object having a concentric circle shape placed in a center of the black background, and an additional object having a radial shape placed in the center of the black background.

The gravity perception function inspection apparatus may further include a footrest support fixture that provides a standing space for the examinee and adjusts an angle and fluidity of a support surface, and a gravity perception error value and perception requirements may be measured and collected for each control condition of the footrest support fixture, and a result report may be generated and provided.

The control device may collect the perception requirements additionally calculated through the pupil response measurement to be mapped to a corresponding inspection item and stored and then generate and provide a result report.

The control device may collect the perception requirements and the change in the brain nervous system additionally calculated by the electroencephalogram measuring device to be mapped to a corresponding inspection item and stored, and generate and provide a result report.

Advantageous Effects

A gravity perception function inspection apparatus based on a virtual reality interface and a bio-signal measuring device of the present invention enables miniaturization of an apparatus and minimization of inspection space constraints, and thus, a gravity perception function inspection operation may be performed anytime and anywhere.

Whereas the known inspection apparatus may only evaluate the vestibular function (otolith organ function), the present invention may also evaluate the visual-vestibular function interaction in a gravity perception process.

In contrast to the known inspection that performs an indirect gravity perception inspection through visual evaluation, a method of calculating an error angle at which the head and a central axis of the body are directly aligned in a gravity direction, which is a method by which the human body perceives the gravity, is introduced to improve accuracy of gravity perception function evaluation in a physiological manner. In this case, the influence due to somatosensory is blocked by forming a specific angle with a horizontal plane or by using a floating footrest.

In addition, by additionally checking and notifying perception requirements for each inspection item based on a pupil size, a gravity perception failure rate due to a decrease in individual perception ability in a complex stimulus situation requiring visual-vestibular integration in the elderly, dementia, and so on may be calculated and provided.

In addition, the present invention provides a bio-signal marker for a screening inspection which evaluates perception ability such as dementia by measuring response of a brain nervous system of an examinee by using an electroencephalogram measuring device and additionally calculating individual perception requirements and a change in the brain nervous system.

BRIEF DESCRIPTION OF THE DRAWINGS

FIG. 5 illustrates inspection items that may be provided through the gravity perception function evaluation apparatus according to an embodiment of the present invention.

BEST MODE FOR INVENTION

Objects and effects of the present invention, and technical configurations for achieving the objects and effects will become clear with reference to the embodiments described below in detail with reference to the accompanying drawings. In describing the present invention, when it is determined that a detailed description of a related well-known function or configuration may unnecessarily obscure the gist of the present invention, the detailed description thereof is omitted.

In addition, terms to be described below are set in consideration of functions of the present invention, which may change depending on intentions or customs of an examinee and an operator.

However, the present invention is not limited to the embodiments disclosed below and may be implemented in various different forms. Only the present embodiments are provided to complete the disclosure of the present invention and to fully inform those skilled in the art to which the present invention belongs of the scope of the invention, and the present invention is defined by the scope of the claims. Therefore, the definition should be made based on the descriptions throughout the present specification.

Figure 1:
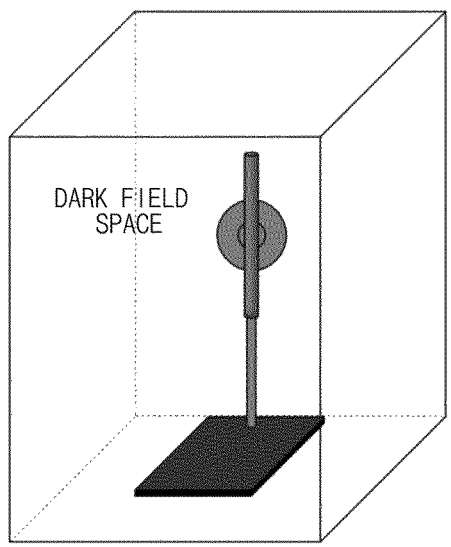
FIG. 1 is a view illustrating a gravity perception function evaluation apparatus according to the conventional technology.
Figure 2:
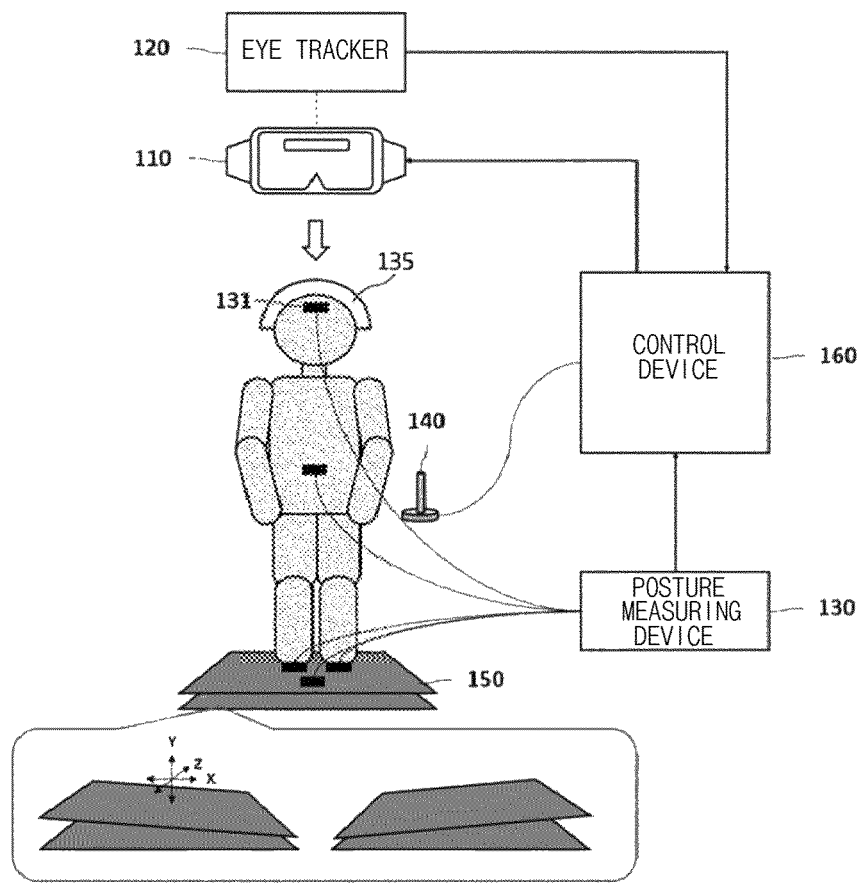
FIG. 2 illustrates a gravity perception function evaluation apparatus according to an embodiment of the present invention.

FIG. 2 illustrates a gravity perception function evaluation apparatus according to an embodiment of the present invention.

Figure 3:
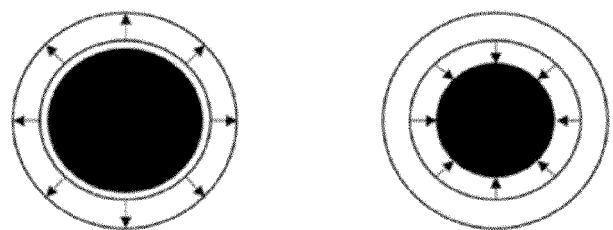
FIG. 3 illustrates a change in pupil size of an examinee according to a change in perception requirements through an eye tracker 120 in the gravity perception function evaluation apparatus illustrated in FIG. 2.

FIG. 3 illustrates a change in size of a pupil of an examinee according to a change in perception requirements through an eye tracker 120 in the gravity perception function evaluation apparatus illustrated in FIG. 2.

Figure 9:
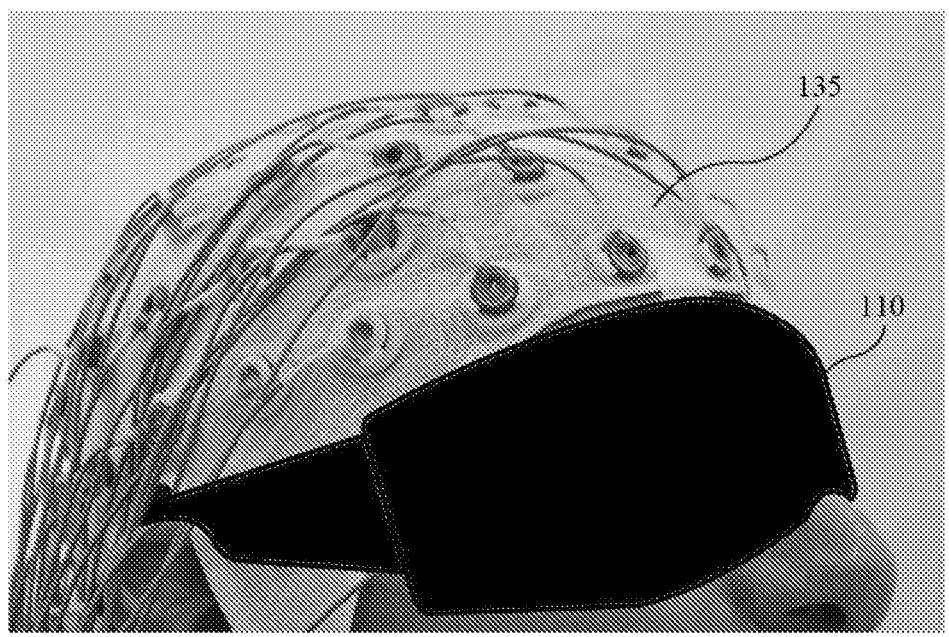
FIG. 9 is a photograph of a state in which a head wearable display device 110 and an electroencephalogram measuring device 135 are actually worn in a gravity perception function evaluation apparatus 100 illustrated in FIG. 2.

FIG. 9 is a photograph of a state in which a head wearable display device 110 and an electroencephalogram measuring device 135 are actually worn in a gravity perception function evaluation apparatus 100 illustrated in FIG. 2.

As illustrated in FIG. 2, the gravity perception function evaluation apparatus of the present invention includes a head-wearable display device 110, bio-signal measuring devices 120, 130, and 135, a footrest support fixture 150, a control device 160, and so on, wherein the bio-signal measuring devices 120 and 130 include an eye tracker 120, a posture measuring device 130, and so on.

The head-wearable display device 110 reproduces an inspection screen provided by the control device 160 in virtual reality (VR), augmented reality (AR), mixed reality (MR), extended reality (XR), and so on to allow an examinee to experience a virtual world as a real world. This may be implemented by a Head Mounted Display (HMD), a Google glass, a Microsoft Hololens, or so on, but is not limited thereto.

The eye tracker 120 is located to look at both eyes of an examinee in the head-wearable display device 110 and detects and outputs sizes of pupils of the examinee.

The posture measuring device 130 includes a plurality of inertial measurement unit (IMU) sensors that are dispersedly attached to the head, body, lower legs, and support surfaces of an examinee, and collects detected values of the IMU sensors for each body part and performs integrated analysis to infer an error between the examinee's head or a central axis of a body thereof and calculate and outputs position control value of the examinee based on analyzed value.

The electroencephalogram measuring device 135 measures a brain nervous system response of an examinee, and additionally calculates an individual perception requirements according to an inspection mode and a change in the brain nervous system.

The human interface device 140 includes a keyboard, a controller dedicated to a head-wearable display device, a joystick, and so on, and obtains and outputs a position control value manually input by an examinee by operating any one of those.

The footrest support fixture 150 provides a standing space for an examinee. By randomly adjusting an angle of a support fixture in a three dimensional manner or by adjusting fluidity, the examinee blocks use of somatosensory sensation in the process of perceiving the gravity.

The control device 160 performs at least one of a vestibular function inspection and a visual-vestibular interaction inspection, and configures differently and provides an inspection screen corresponding to inspection items and footrest support movement.

In addition, by comparing a position control value obtained by any one of the posture measuring device 130 and the human interface device 140 with a preset target value for each inspection item, a gravity perception error value is calculated and stored.

For reference, in order to perceive the gravity among visual stimuli, a visual system, a somatosensory system, and a vestibular sensory system are simultaneously stimulated to evaluate a stimulus through a central integration process between the sense organs, and a relatively high perception is required in this process.

Particularly, there are characteristics that a pupil size is changed according to the perception requirements, the control device 160 of the present invention enables backward tracking of the perception requirements for understanding and solving the current situation based on the pupil size.

That is, as illustrated in FIG. 3, the perception requirements for each inspection item may be additionally calculated and notified based on a change in pupil size.

In addition, in order to measure a change in individual brain nervous system according to an inspection mode as well as the perception requirements, an electroencephalogram (EEG) measuring device 135 is added, and as illustrated in FIGS. 2 and 9, the head-wearable display device 110 linked to an operation of the electroencephalogram measuring device 135 is worn.

Through this, the control device 160 of the present invention may be utilized as a bio-signal marker for selective inspection that evaluates perception intelligence such as dementia, as well as a perception requirements for understanding and solving the current situation. As described above, the present invention may implement the gravity perception function evaluation device by using a portable device including the head-wearable display device 110 and the footrest support fixture 150, and thus, it is possible to evaluate an examinee's gravity perception function anytime and anywhere without a separate inspection room for a dark field.

Figure 4:
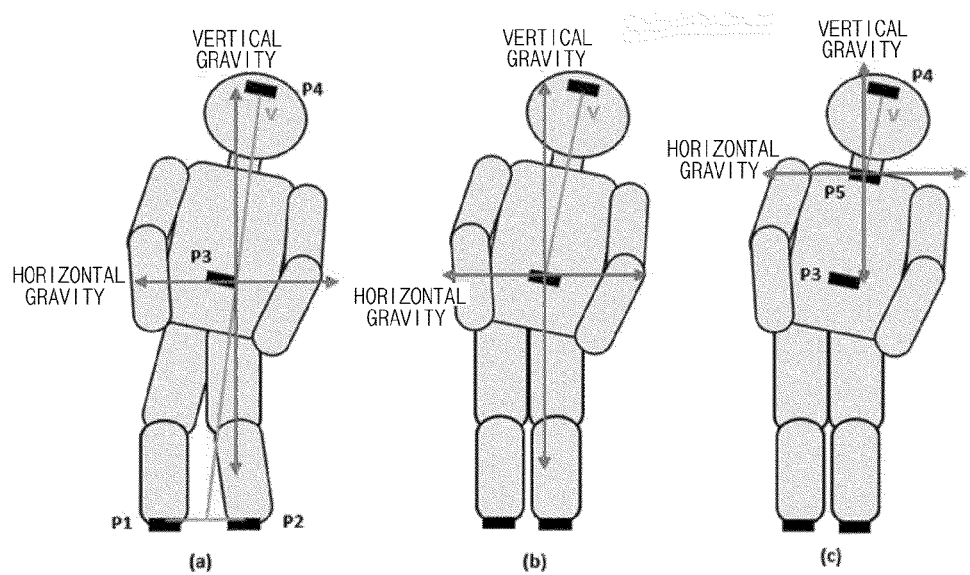
FIG. 4 illustrates a posture alignment-based measurement method in a gravity direction, according to an embodiment of the present invention.

FIG. 4 illustrates a method of measuring a posture based on an inertial measurement sensor, according to an embodiment of the present invention.

As illustrated in FIG. 4, in the present invention, a plurality of inertial measurement sensors 131 are dispersedly disposed on the head, stomach, both feet, and so on.

Then, three-dimensional position values of various parts of a patient's body are detected by the plurality of inertial measurement sensors 131, and posture values are obtained and output by combining the sensing results.

For example, after position values P1 and P2 of both feet, a position value P3 of waist, and a position value P4 of head are detected as illustrated in (a) of FIG. 4, a posture vector V from central points of both feet to the center of the waist and the center of the head is generated. In addition, a position control value of an examinee is calculated based on a difference in angle between the posture vector V and a vertical direction of gravity.

In addition, as illustrated in (b) of FIG. 4, after the posture vector V from the center of the waist to the center of the head is generated based on the position value P3 of the waist and the position value P4 of the head, a position control value of an examinee is calculated based on a difference in angle between the posture vector V and a vertical direction of gravity.

Alternatively, as illustrated in (c) of FIG. 4, after the posture vector V penetrating the center of the neck and the center of the head is generated by sensing the position value P4 of the head and the position value P5 of the neck, a position control value of an examinee is calculated based on a difference in angle between the posture vector V and a vertical direction of gravity. In this case, it is preferable that the position value P5 of the neck is measured based on the lowest side of the neck.

In the method of (a) of FIG. 4, when the whole body is inclined to one side, the method of (b) of FIG. 4 is suitable for a case in which the lower part of the waist stands up normally, and the method of (c) of FIG. 4 is suitable for a case in which the lower part of the neck stands up normally, but are not limited thereto.

The present invention may provide a plurality of inspection items as illustrated in FIGS. 5 to 8, and configure and provide different inspection screens depending on inspection items.

Figure 6:
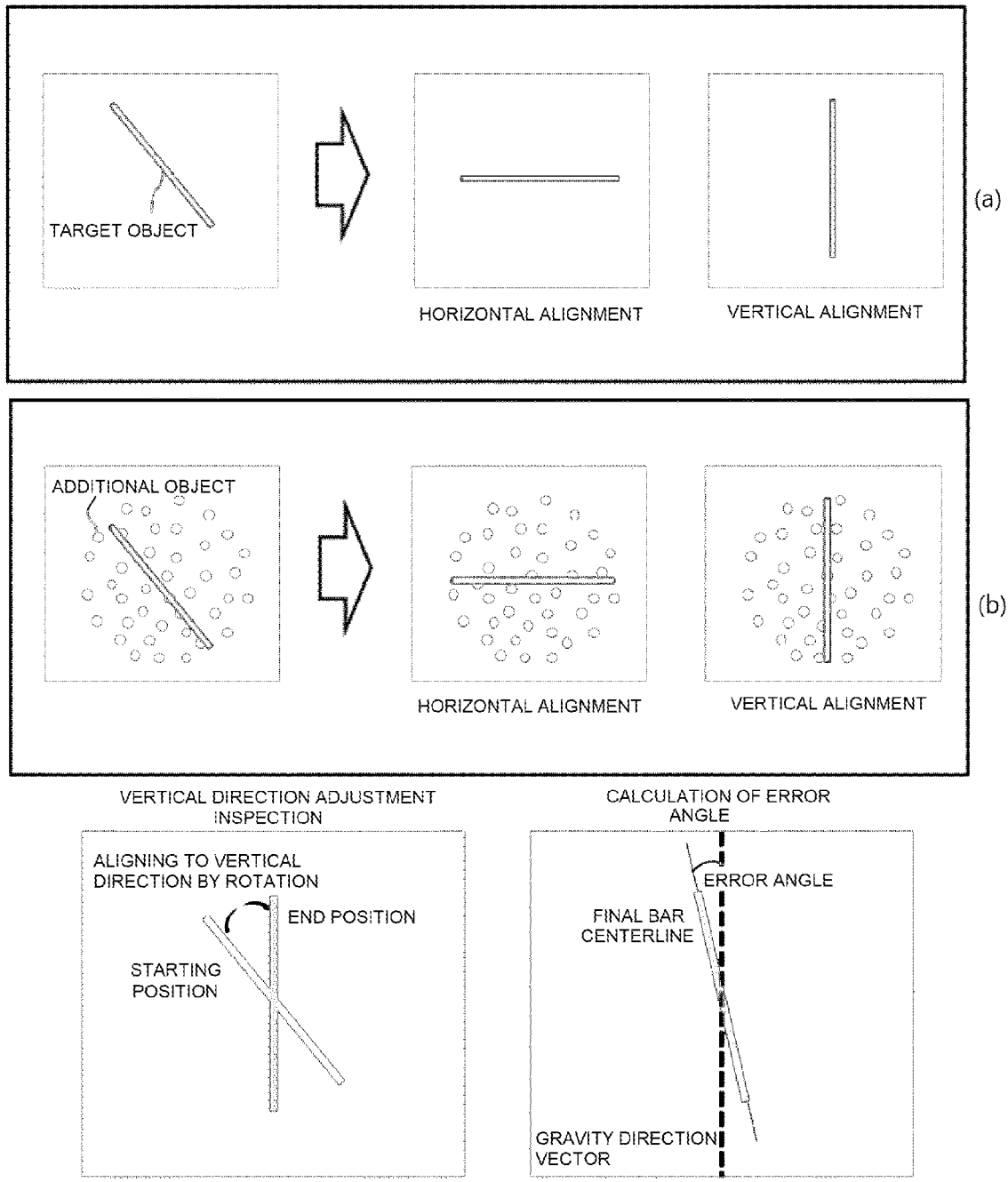
FIGS. 6 to 8 are examples of providing inspection screens being changed according to the inspection items that may be provided through the gravity perception function evaluation apparatus according to the embodiment of the present invention.
Figure 7:
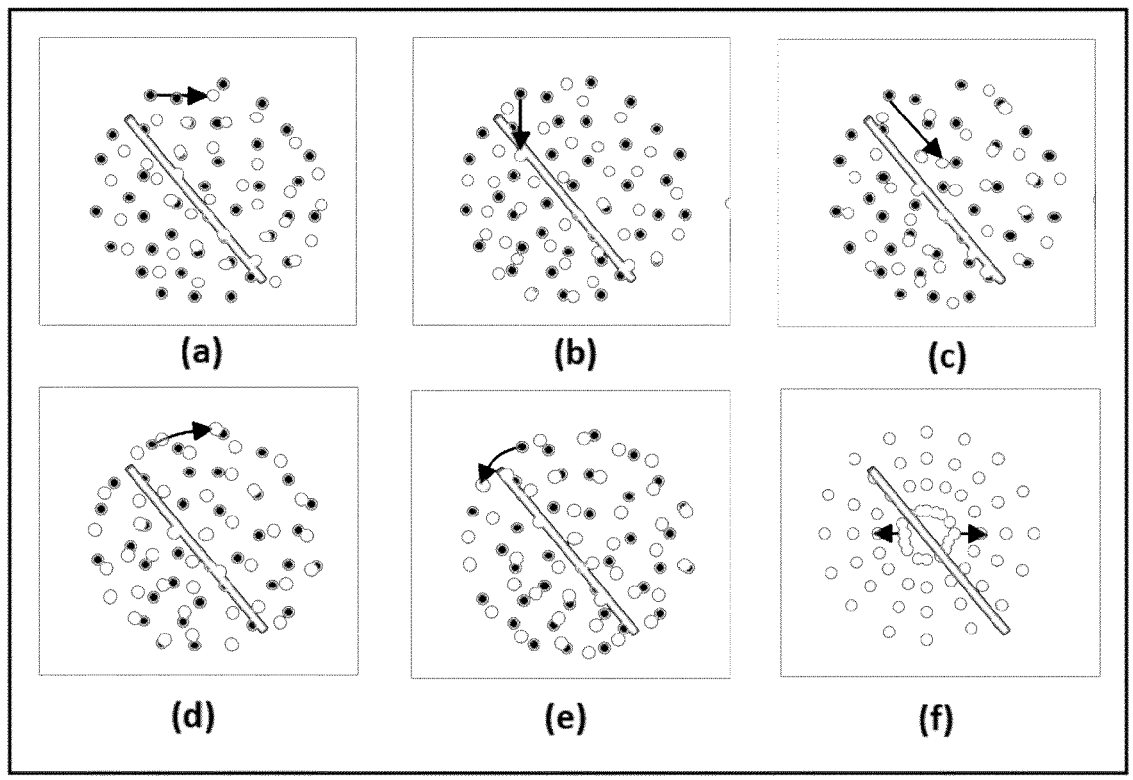
Figure 8:
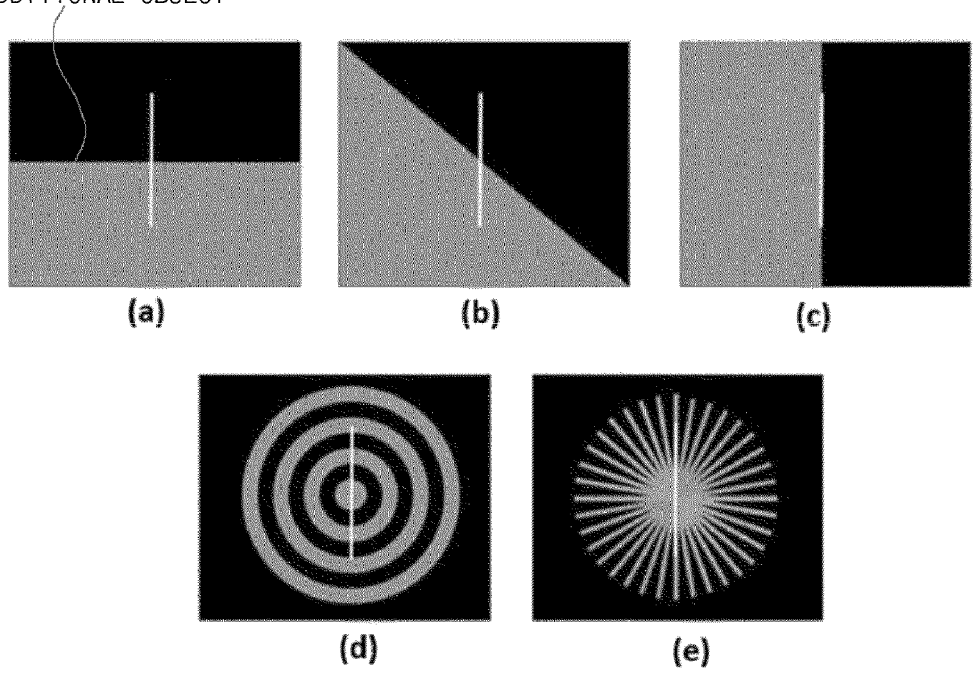

FIG. 5 illustrates inspection items that may be provided through the gravity perception function evaluation apparatus according to an embodiment of the present invention, and FIGS. 6 to 8 illustrate configuration examples of inspection screens that change depending on inspection items.

Referring to FIG. 5, the gravity perception function evaluation apparatus of the present invention may perform 1) a vestibular function (otolith organ function) inspection, 2) a visual-vesicular interaction inspection, and so on.

1) The vestibular function (otolith organ function) inspection may consist of (1) basic screen inspection and (2) additional object additional screen inspection.

(1) When inspecting a basic screen, as illustrated in (a) of FIG. 6, an inspection screen, on which a target object such as a colored bar (for example, a yellow bar) is displayed in the center on a black background, may be provided. That is, a basic inspection screen is configured and provided for an examinee to perform a position control operation of the target object in a blackout environment.

(2) When inspecting an additional object addition screen, as illustrated in (b) of FIG. 6, a plurality of additional objects implemented as very small figures (for example, dots) are additionally displayed on the basic inspection screen, and thereby, the examinee may move a position of the target object in a desired direction by a desired distance by referring to the additional object as a topographical index.

2) The visual-vestibular interaction inspection may be composed of (1) a structured visual flow provision inspection and (2) a visual distortion provision inspection.

(1) The structured visual flow provision inspection includes (a) a horizontal visual flow inspection, (b) a vertical visual flow inspection, (c) an oblique visual flow inspection (d) a clockwise rotation visual flow inspection, (e) a counterclockwise rotation visual flow inspection, (f) a regular radial diffusion inspection, and (g) an atypical radial diffusion inspection. In other words, by providing a structured visual flow in which a plurality of additional objects move according to a preset pattern in a very small figure, how each visual flow affects gravity perception may be measured separately for each individual.

(a) When performing the horizontal flow inspection, as illustrated in (a) of FIG. 7, an inspection screen, on which a display position of the additional object is moved in the horizontal direction according to a preset speed, is configured and provided.

(b) When performing the vertical flow inspection, as illustrated in (b) of FIG. 7, an inspection screen, on which the display position of the additional object is moved in the vertical direction according to the preset speed, is configured and provided.

(c) When performing the oblique visual flow inspection of a preset angle, as illustrated in (c) of FIG. 7, an inspection screen, on which the display position of the additional object is moved according to the preset speed in a linear direction of a given angle, is configured and provided.

(d) When performing the clockwise rotation visual flow inspection, as illustrated in (d) of FIG. 7, an inspection screen, on which the display position of the additional object is moved in a clockwise direction according to the preset speed, is configured and provided.

(e) When performing the counterclockwise rotation visual flow inspection, as illustrated in (e) of FIG. 7, an inspection screen, on which the display position of the additional object is moved in a counterclockwise direction according to the preset speed, is configured and provided.

(f) When performing a radial visual flow inspection, as illustrated in (e) of FIG. 7, the display position of the additional object radially spreads from the center to the periphery or provides a visual flow converging from the periphery to the center. In this case, a speed of the visual flow from the center is configured to be constant or configured differently depending on positions.

(2) The visual distortion provision inspection may include (a) a horizontal visual inspection, (b) an oblique visual inspection, (c) a vertical visual inspection (d) a concentric circle visual inspection, (e) a radial visual inspection, and so on. That is, a display format may be provided in various formats that may achieve the purpose of providing visual vertical/horizontal information to an examinee or simulating a situation in which vertical/horizontal directions and intentionally distorted visual information are given.

(a) When performing the horizontal visual inspection, as illustrated in (a) of FIG. 8, an inspection screen, on which an additional object implemented in a form in which a background screen is halved in the horizontal direction is additionally displayed, is configured and provided.

(b) When performing the oblique direction visual inspection, as illustrated in (b) of FIG. 8, an inspection screen, on which an additional object that halves the background screen in an oblique direction is additionally displayed, is configured and provided.

(c) When performing the vertical direction visual inspection, as illustrated in (c) of FIG. 8, an inspection screen that halves the background screen in the vertical direction is additionally displayed, is configured and provided.

(d) When performing the concentric circle visual inspection, as illustrated in (d) of FIG. 8, an inspection screen, on which for additionally displaying concentric circle-shaped additional objects arranged in the center of the background screen is configured and provided.

(e) In the case of a radial visual inspection, as illustrated in FIG. 8 (e), an inspection screen, on which an additional object having a shape of a concentric circle disposed in the center of the background screen is additionally displayed, is configured and provided.

As described above, the present invention allows at least one of the above-described inspection items to be selected according to characteristics of an examinee, and by sequentially generating and providing inspection screens corresponding to the selected inspection items, gravity perception of the examinee may be evaluated from various viewpoints.

Figure 10:
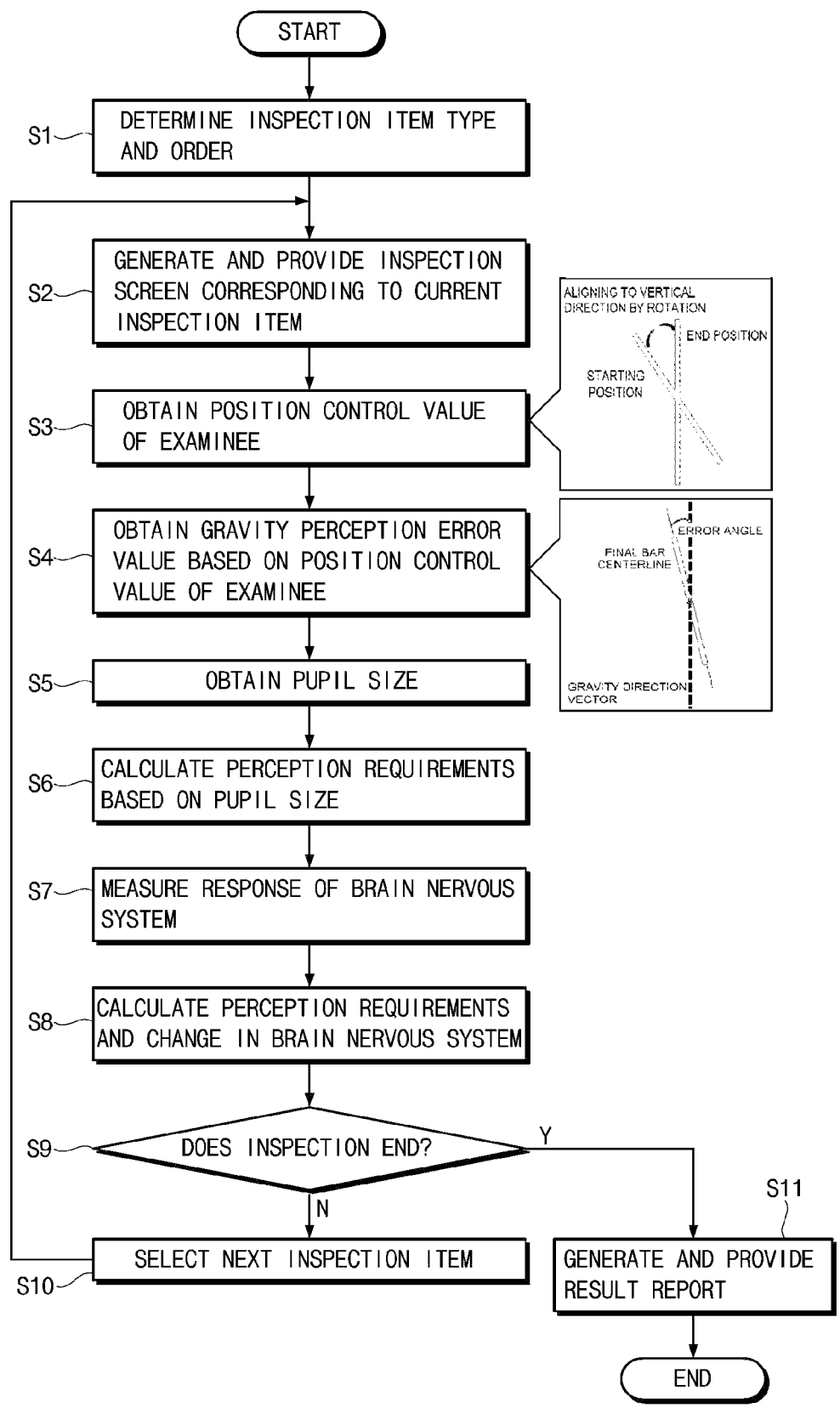
FIG. 10 is a flowchart illustrating a gravity perception function evaluation method according to an embodiment of the present invention.

FIG. 10 is a flowchart illustrating a gravity perception function evaluation method according to an embodiment of the present invention.

First, when a gravity perception function evaluation is requested by an examinee or a medical team, the type and order of inspection items to be provided to the examinee are determined (S1).

In addition, an inspection screen corresponding to the first inspection item is configured and provided (S2), a position control value of the examinee is obtained by using any one of the posture measuring device 130 and the human interface device 140 (S3), the position control value is compared with a preset target position value to obtain a gravity perception error value, and then the gravity perception error value is mapped to the current inspection item and stored (S4).

In addition, a pupil size is detected by using the eye tracker 120 during step S3 and step S4 (S5), and then, perception requirements are additionally calculated based on the pupil size of the examinee, and then the perception requirements are additionally mapped to the current inspection item and stored (S6).

In addition, the response of a brain nervous system is measured by using the electroencephalogram measuring device 135 (S7), and individual perception requirements and a changes in the brain nervous system according to an inspection mode of the examinee are additionally calculated to be additionally mapped to the current inspection item and stored (S8).

The gravity perception function evaluation operation is repeatedly performed while changing an inspection item provided to the examinee (S9 and S10), and when inspections for all items are completed, the gravity perception error value, the perception requirements, and the change in brain nervous system for each inspection item are collected and provided as a report, and then, the operations end (S9 and S11).

That is, the present invention configures various inspection items at the request of an examinee or a medical team, obtains and collects a gravity perception error value and perception requirements corresponding to each inspection item, and generates and provides a customized result report.

In addition, the present invention performs the method of FIG. 10 and at the same time moves the footrest support fixture according to various control conditions, and then measures and collects a gravity perception error value and perception requirements whenever the control conditions of the footrest support fixture are changed.

In other words, it is possible to generate and provide a customized result report by repeatedly measuring and collecting gravity perception error values and perception requirements according to inspection items and conditions of a footrest support fixture.

The above description is merely illustrative of the technical idea of the present invention, and various modifications and changes may be made without departing from the essential characteristics of the present invention by those skilled in the art to which the present invention belongs. Therefore, the embodiments disclosed in the present invention are not intended to limit the technical idea of the present invention, but to describe, and the scope of the technical idea of the present invention is not limited by the embodiments. The protection scope of the present invention should be interpreted by the following claims, and all technical ideas within the scope equivalent thereto should be construed as being included in the scope of the present invention.

The invention claimed is:

1. A gravity perception function inspection apparatus based on virtual/augmented reality interface and bio-signal measuring device, the gravity perception function inspection apparatus comprising:
    a head-wearable display device worn on an examinee's head and reproducing an inspection screen in which a target object is displayed in a center of the inspection screen;
    the bio-signal measuring device including an eye tracker that detects a pupil size of an examinee, and a posture measuring device that infers a posture value of the examinee by using a plurality of inertial measurement sensors dispersedly arranged on a body of the examinee and obtains and outputs a position control value corresponding to the posture value of the examinee;
    a human interface device that obtains and outputs a position control value manually input by the examinee;
    a footrest support fixture that provides a standing space for the examinee and adjusts an angle and fluidity of a support surface; and
    a control device that generates and provides the inspection screen, compares the position control value obtained by any one of the posture measuring device and the human interface device with a preset target position value to obtain and provide a gravity perception error value, and additionally obtains and provides perception requirements based on the pupil size of the examinee,
    wherein the bio-signal measuring device further includes an electroencephalogram measuring device that measures response of a brain nervous system of the examinee and additionally calculates individual perception requirements and a change in the brain nervous system according to an inspection mode,
    wherein a gravity perception error value and perception requirements are measured and collected for each control condition of the footrest support fixture, and a result report is generated and provided.

2. The gravity perception function inspection apparatus of claim 1, wherein
    the control device performs at least one of a vestibular function inspection and a visual-vestibular interaction inspection and configures and provides an inspection screen differently depending on inspection items.

3. The gravity perception function inspection apparatus of claim 2, wherein
    the control device collects the gravity perception error value and the perception requirements for each inspection item and generates and provides a result report.

4. The gravity perception function inspection apparatus of claim 3, wherein
    the control device performs the vestibular function inspection based on a basic inspection screen in which the target object is centrally displayed on a black background.

5. The gravity perception function inspection apparatus of claim 3, wherein
    the control device performs the vestibular function inspection based on the inspection screen in which the target object is centrally displayed on a black background and a plurality of small additional objects are additionally displayed.

6. The gravity perception function inspection apparatus of claim 3, wherein
    the control device performs the visual-vestibular interaction inspection based on the inspection screen in which the target object is centrally displayed on a black background and that additionally provides a structured visual flow in which positions of a plurality of additional objects are moved according to a preset pattern.

7. The gravity perception function inspection apparatus of claim 6, wherein
    the control device performs a structured visual flow through at least one of a visual flow in which a plurality of additional objects move in a horizontal direction, a visual flow in which the plurality of additional objects move in a vertical direction, a visual flow in which the plurality of additional objects move in an oblique direction, a visual flow in which the plurality of additional objects rotate in a clockwise direction, a visual flow in which the plurality of additional objects rotate in a counterclockwise direction, and a visual flow in which the plurality of additional objects radiate or converge from a center of the inspection screen to a periphery thereof.

8. The gravity perception function inspection apparatus of claim 3, wherein
the control device performs the visual-vestibular interaction inspection based on the inspection screen in which the target object is centrally displayed on the black background and an additional object for inducing visual distortion is additionally displayed.

9. The gravity perception function inspection apparatus of claim 8, wherein
the control device implements at least one of an additional object that halves the black background in the horizontal direction for the additional object for inducing visual distortion, an additional object that halves the black background in an oblique direction, an additional object having a concentric circle shape placed in a center of the black background, and an additional object having a radial shape placed in the center of the black background.

10. The gravity perception function inspection apparatus of claim 1, wherein
the control device collects the perception requirements and the change in the brain nervous system additionally calculated by the electroencephalogram measuring device to be mapped to a corresponding inspection item and stored, and generates and provides a result report.

* * * * *